Patented Nov. 18, 1952

2,618,566

UNITED STATES PATENT OFFICE 2,618,566

MAGNESIUM ALUMINATE PEBBLE

Sam P. Robinson, Bartlesville, Okla., assignor to Phillips Petroleum Company, a corporation of Delaware No Drawing. Application December 9, 1949, Serial No. 132,201

18 Claims. (Cl. 106—62)

The invention relates to the manufacture of alumina-bonded spinel or magnesium aluminate pebbles for pebble heat-exchange processes and to improved heat-exchange processes effected in the presence of alumina-bonded spinel pebbles.

Pebble heater techniques being developed and applied to various gas heating, treating, and reaction processes at the present time make use of a compact stream of small refractory pebbles as a moving heat-exchange medium. These pebbles which are usually ceramic materials, although they may be metallic for some applications, are spheres ranging in size from about ⅛" to 1" in diameter. They may be either catalytic or non-catalytic in a given application. In typical pebble heater operation, a continuous compact mass of pebbles descends by gravity thru a series of treating zones and upon emerging from the lowermost zone, they are elevated by a suitable elevator, usually of the bucket type, to a point above the uppermost zone for again gravitating thru the system. The uppermost zone is usually a pebble heating zone where the pebbles are contacted in countercurrent flow with a stream of hot combustion gas so as to raise their temperature to a desired degree as they descend thru the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

In another type of pebble heat-exchange process, a gravitating mass of pebbles is utilized to maintain a cold zone or to cool a gas. The pebbles are cooled by contact with a cold gas in one chamber and the cold pebbles are then gravitated thru a second chamber in contact with the gas to be cooled. In such processes the pebbles undergo great differences in temperature with the usual mechanical shock and attrition forces involved in gravitating masses of pebbles.

The pebbles of the invention are utilized to advantage in such processes as those disclosed in my copending applications Serial No. 651,293, filed March 1, 1946, involving the production of $CS_2$, and Serial No. 662,149, filed April 15, 1946, relating to the cracking of hydrocarbons to hydrogen and coke, as well as the process of the copending application of M. O. Kilpatrick, Serial No. 761,696, filed July 17, 1947, relating to the thermal conversion of hydrocarbons to more desirable hydrocarbons. These processes involve temperature changes of the order of 1000° to 2000° F. per minute, with severe mechanical shock and abrasive forces present.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates greater than 1000° F. per minute and cooling rates of more than 2000° F. per minute at maximum temperatures in the neighborhood of 3000° F. In addition to the severe thermal shock resulting from such rapid temperature changes, the pebbles are subjected to considerable mechanical shock in passing thru the apparatus, especially in the elevator equipment and in dropping from the top of the elevator into the top of the pebble heating zone. It is found that considerable breakage and loss of pebbles occurs when using conventional commercial pebbles under such severe conditions of operation.

Pebbles which have been made from powdered alumina, mullite, zircon, magnesia, clays, and similar materials, by wetting the powder and rolling the material, with or without a binder, in conventional balling equipment until balls of the proper size have been formed, are found to exhibit laminar structure and suffer breakage under the strain of pebble heater operating conditions. Pebbles which are made by slugging and compacting the slugs into spheres do not exhibit this laminar structure and are much more resistant to breakage under pebble heater operation conditions. However, it has been found that even when pebbles have been made by slugging and compacting the slugs into balls, they must be fired at a temperature within a critical range in order to properly bond the pebble crystals and produce a pebble which is rugged under severe conditions of service. The critical temperature range for firing a specific pebble depends upon the ingredients of the pebble, e. g., the critical range for firing high purity alumina pebbles is 3000° to 3150° F. as disclosed in my copending application, Serial No. 23,245, filed April 26, 1948, and a zirconia-stabilized alumina pebble containing from 0.5 to 5 weight per cent zirconium oxide requires a firing temperature in the range of 2950° to 3250° F. as disclosed in my copending application, Serial No. 53,590, filed October 8, 1948.

It is found that considerable breakage and attrition of the pebbles occurs when utilizing commercially available pebbles under the severe conditions of operation involved in high temperature pebble heat exchange processes; for example, in a pebble heater process requiring the circulation of between 25,000 and 35,000 pounds of pebbles per hour with a maximum temperature shock in the neighborhood of 1000° F. per minute, the attrition and breakage loss on the best commercially available alumina pebbles amounts to a minimum of 200 pounds per day and runs as high as 700 pounds per day. This pebble loss amounts to between 0.8 and 2 per cent per day and represents an economic factor to be reckoned with in pebble heater operation. This substantial loss of pebbles due to attrition and breakage merely points up the need for more rugged and more attrition and shock resistant pebbles.

Spinel, which is a magnesium aluminate, has been found to be an excellent pebble material when properly bonded. It has a high melting point in the neighborhood of 3875° F. and is very hard and abrasive resistant without being unduly brittle.

The principal object of the invention is to provide a pebble of improved abrasion and breakage resistance in cyclic heat-exchange processes. Another object of the invention is to provide a method of manufacturing a pebble having high resistance to attrition and breakage in gravitating bed heat-exchange processes involving severe mechanical and thermal shock conditions and abrasion forces. A further object of the invention is to provide a method of heat treating a magnesium aluminate-alumina raw pebble so as to produce a strongly bonded magnesium aluminate pebble. It is also an object of the invention to provide improved heat-exchange processes, including hydrocarbon conversion, utilizing the more rugged magnesium aluminate pebbles of the invention. Other objectives of this invention will become apparent from a consideration of the accompanying disclosure.

The invention is concerned principally with the bonding of magnesium aluminate or spinel into strong rugged pebbles having high resistance to breakage, attrition, and fluxing and in its broadest embodiment entails preparing an intimate, compactable, plastic mixture of relatively pure powdered spinel or magnesium aluminate in major proportion and active alumina in minor proportion, compacting the mixture into balls and firing the balls at a temperature in the range of 2900° to 3200° F. until the alumina is converted to alpha corundum and the balls are strongly bonded. The preferred proportions of spinel and alumina are 80 to 98 weight per cent of the former and 20 to 2 weight per cent of the latter. Alumina in a lesser amount than 2 per cent does not provide sufficient binding material to provide an adequate bond for the magnesium aluminate while larger amounts of alumina than about 20 per cent gradually change the character of the pebble from a spinel to an alumina pebble as the amount of alumina increases.

It is found that the addition of an alpha corundum crystal growth inhibitor to the pebble composition in small amounts improves the life of the pebble. Alpha corundum crystals which are formed when alumina hydrates and gamma alumina are calcined at temperatures in the neighborhood of 2000° F. are subject to considerable growth when subjected to heating and cooling at elevated temperatures under the conditions prevailing in pebble heat-exchange processes. This gradual growth of corundum crystals eventually disrupts the crystal arrangement within the pebble causing fissures and eventual breakage of the pebble. Alpha corundum crystal growth stabilizers significantly and materially reduce corundum crystal growth and thereby extend the life of the pebbles materially. Stabilizers for this purpose are the oxides of zirconium, vanadium, and molybdenum. One of these oxides or a compound of one of these metals converted to the oxide by calcination at temperatures below about 2600° F. is included in the pebble composition in finely comminuted form and preferably is mixed with the alumina before admixing the alumina and spinel. The amount of the stabilizer to be added depends upon the particular stabilizer. For zirconia and vanadia the amount ranges from 0.1 to 5 weight per cent based upon the weight of the alumina and calculated as $ZrO_2$ and $V_2O_3$, respectively, while the amount of molybdena ranges from 2 to 10 weight per cent calculated as $MoO_3$.

The alumina for the pebbles of the invention may be incorporated in the pebble mixture in the form of aluminum hydroxide, gamma alumina, or any of the hydrated aluminas which are converted to alpha corundum by heating to elevated temperatures. It is desirable that the alumina be of high purity, such as 99 per cent, and preferably 99.5 per cent. Purified bauxite, precipitated aluminum hydroxide, and the alumina manufactured in the Bayer process are examples of suitable raw materials for the pebble. The alumina raw material should be only lightly calcined so as to eliminate most of the shrinkage which it would otherwise undergo in the pebble firing step, but should not be dead burned so as to render the alumina unreactive. A preferred alumina is precalcined crypto-crystalline alpha corundum formed by lightly calcining Bayer process alumina at temperatures in the neighborhood of 2100° F. The alumina must be finely comminuted to at least 100 mesh and preferably to the range of 325 to 625 mesh so as to produce an extremely fine grain and form an intimate mixture with the spinel and the metal oxide stabilizer when one is used.

A preferred method of manufacturing spinel pebbles comprises forming an intimate mixture of stoichiometrical proportions of magnesium oxide (or hydroxide) and aluminum oxide (or hydroxide) and calcining the mixture at reaction temperatures until the magnesium and aluminum oxides are converted to magnesium aluminate. This reaction generally requires a temperature in the range of 3200° to 3800° F. depending upon the amount and kind of impurities in the mixture. The calcination is continued for a period in the range of 4 to 30 hours so as to substantially reduce further heat shrinkage, complete the reaction to spinel, and develop maximum crystal growth. The fired mass is then cooled and comminuted to pass a 150 mesh or finer screen. The screened product is mixed with fresh and only lightly calcined alumina and an alumina crystal growth inhibitor selected from the group consisting of the oxides and compounds converted to the oxide by heating of zirconium, vanadium, and molybdenum. The mixture of raw materials is plasticized to a homogeneous mix utilizing organic plasticizing agents, temporary bonding agents and water, if desired. The amount of water included in the mixture should be such that the mix has the proper consistency for extrusion in a piston or auger type extrusion press. When the consistency of the mix is properly adjusted the mix is extruded, cut into slugs of a length approximating the diameter, rolled into balls by tumbling or other suitable method, then given a predrying or light calcination at a temperature below about 400° F., and finally fired at a temperature in the range of 2900° to 3200° F. for a period of at least 24 to 2 hours and until the alumina is converted to alpha corundum and the spinel is properly bonded.

Binders and plasticizing agents which may be used in the pebble mix include water and volatile organic materials, such as Sterotex (hydrogenated corn oil), any of the synthetic or natural resins (including wood rosin), petroleum pitch, stearic acid, aluminum stearate, carboxymethylcellulose, starch, flour, molasses, sugar, dextrin, shellac, glue, etc. The amount of water used in the mix should not exceed 25 per cent and when organic binders or plasticizers are added the amount of water can be cut down in proportion to the amount of organic material incorporated. The organic material, when incorporated with water in the pebble mix, may amount to between 2 and 10 weight per cent of the mix. The pebbles or balls may also be compacted from a homogeneous plastic mix of the constituents and an organic binder without the use of added water in which case from 5 to 15 weight per cent of binder is added. In this method of manufacture it may be desirable to apply heat to the mix in order to facilitate the pebble forming step.

Another pebble forming method comprises starting with a small nucleus $\frac{1}{16}''$ to $\frac{3}{16}''$ in diameter prepared by firing a mixture of spinel and alumina so as to bond the spinel and thereafter applying successive layers of powdered raw materials using a tacky binder of the class described and particularly dextrin, molasses, sugar, glue, and shellac. The core can readily be made by nodulizing or by the "cottage cheese" method of forming small balls. It is also feasible to build up the entire pebble from a mixture of the raw materials and the tacky binder utilizing the nodulizing or cottage cheese method.

The invention in its broadest sense does not require any specific pebble forming step although it is preferred to form the pebbles from an extrudable plastic mix of the pebble raw materials by extruding, cutting the extrudate into slugs, and thereafter compacting the slugs into spheres by tumbling in a three-dimensional type cylindrical tumbler because this method produces superior pebbles in attrition and fracture resistance in cyclic pebble heat-transfer equipment. Any method of compacting the pebble constituents into a relatively homogeneous, dense, coherent ball or sphere is suitable and within the scope of the invention. Pebbles made by the process of the invention have a porosity ranging from 5 to 15 per cent and have an average crushing strength in the range of 1000 to 1600 pounds.

*Example*

1210 pounds of light magnesia formed from calcination of precipitated magnesium hydroxide from seawater or magnesium brine and 3060 pounds of lightly calcined Bayer process alumina are thoroughly mixed and sintered together at 3200° F. for 24 hours. After cooling, the resulting product is crushed and screened to pass a 200 mesh sieve.

The screened product is now intimately mixed with 342 pounds more of lightly calcined Bayer process alumina, 45 pounds of zirconium hydroxide, and 450 pounds of Sterotex (hydrogenated corn oil) in a pan mill and fed to an extrusion press where the mixed material is extruded and sliced into cylinders $\frac{3}{8}$ inch long by $\frac{3}{8}$ inch diameter. These slugs are then tumbled for one hour in drums designed for three dimensional rotation until the slugs are essentially spherical.

The spheres are then carefully heated in a periodic kiln until the hydrogenated corn oil is decomposed and driven off and then calcined for 24 hours at 3100° F. After normal cooling of the kiln, the spheres are removed. They have a crushing resistance between parallel plates in excess of 1200 pounds, a porosity of 9 to 11 per cent, have a smooth surface resistant to attrition and abrasion in pebble heater service, and are quite resistant to heat shock and operating temperatures up to 3250° F. in the pebble heater.

Certain modifications of the invention will become apparent to those skilled in the art and the illustrative details disclosed are not to be construed as imposing unnecessary limitations on the invention.

I claim:

1. An alumina-bonded spinel pebble consisting essentially of a major portion of magnesium aluminate crystals and a minor portion of alumina in the form of alpha corundum crystals, said alumina being stabilized against crystal growth with crystals of a metal oxide alpha corundum crystal stabilizer, said corundum and metal oxide crystals being dispersed in interlocking arrangement with the magnesium aluminate crystals throughout said pebble.

2. A heat-exchange pebble consisting of 75 to 98 weight per cent spinel crystals bonded by an interlocking dispersion of alpha corundum crystals stabilized against crystal growth by a metal oxide alpha corundum crystal stabilizer.

3. The pebble of claim 2 in which said corundum is stabilized with an amount of zirconia in the range of 0.1 to 5 weight per cent based on the weight of the corundum.

4. The pebble of claim 2 in which said corundum is stabilized with an amount of vanadia in the range of 0.1 to 5 weight per cent based on the weight of the corundum.

5. The pebble of claim 2 in which said corundum is stabilized with an amount of molybdena in the range of 2 to 10 weight per cent based on the weight of the corundum.

6. An alumina-bonded spinel pebble consisting essentially of a major portion of magnesium aluminate crystals and a minor portion of alumina in the range of 2 to 20 weight per cent of the pebble in the form of alpha corundum crystals dispersed in interlocking arrangement with the magnesium aluminate crystals so as to form a strongly bonded pebble.

7. An alumina-bonded spinel pebble consisting of 80 to 98 weight per cent spinel crystals and 2 to 20 weight per cent alumina in the form of alpha corundum crystals dispersed in interlocking arrangement with the spinel crystals so as to form a strongly bonded pebble.

8. A process for manufacturing heat-exchange pebbles which comprises sintering an intimate substantially silica-free mixture of stoichiometrical proportions of a magnesium compound selected from the group consisting of the oxide and compounds converted thereto by calcination, and aluminum oxide at an elevated reaction temperature for such a time as to form magnesium aluminate; comminuting the sintered mass of magnesium aluminate to a fineness of at least 150 mesh; forming an intimate plastic compactable mixture comprising the comminuted magnesium aluminate, a minor portion of substantially silica-free active alumina, a stabilizing amount of a metal oxide alpha corundum crystal stabilizer, and a volatile binder and plasticizer; compacting the resulting mixture into small coherent balls; slowly heating the balls so as to drive off volatile matter while avoiding formation of cracks in said balls; and calcining the resulting balls at a temperature in the range of 2900° to 3200° F. for a period in the range of 2 to 24 hours.

9. A process for manufacturing heat-exchange pebbles which comprises sintering an intimate substantially silica-free mixture of stoichiometrical proportions of a magnesium compound selected from the group consisting of the oxide and compounds converted thereto by calcination at temperatures below 2600° F., and aluminum oxide at a temperature in the range of 3200° to 3800° F. for such a time as to form magnesium aluminate, comminuting the sintered mass of magnesium aluminate to a fineness of at least 150 mesh; forming an intimate plastic compactable mixture of the comminuted magnesium aluminate, a minor portion of silica-free active alumina, a stabilizing amount of a metal oxide alpha corundum crystal stabilizer, a volatile organic binder and plasticizer, and water; compacting the resulting mixture into small coherent balls; slowly heating the balls so as to drive off volatile matter while avoiding formation of cracks in said balls; and calcining the resulting balls at a temperature in the range of 2900° to 3200° F. until the alumina is converted to alpha corundum, the corundum is stabilized by the metal oxide, and the balls are firmly bonded.

10. The process of claim 9 in which the metal oxide stabilizer is 0.1 to 5 weight per cent zirconia based on the weight of the alumina.

11. The process of claim 9 in which the metal oxide stabilizer is 0.1 to 5 weight per cent vanadia based on the weight of the alumina.

12. The process of claim 9 in which the metal oxide stabilizer is 2 to 12 weight per cent molybdena based on the weight of the alumina.

13. A process for manufacturing heat-exchange pebbles which comprises forming an intimate plastic compactable mixture of powdered spinel, a finely comminuted aluminum compound selected from the group consisting of active alumina and aluminum compounds converted thereto by calcination at temperatures below 2600° F., a stabilizing amount of a metal oxide alpha corundum crystal stabilizer and a volatile binder and plasticizer; compacting said mixture into small coherent balls; slowly heating the balls so as to drive off the volatile matter while avoiding formation of cracks in said balls; calcining the resulting balls at a temperature in the range of 2900° to 3200° F. for a period in the range of 2 to 24 hours so as to bond the spinel crystals with alpha corundum and stabilize alpha corundum crystal growth.

14. The process of claim 13 in which the stabilizer is a zirconium compound of the class consisting of the oxide and compounds converted to the oxide by calcination at temperatures below 2600° F. in an amount in the range of 0.1 to 5 weight per cent calculated as $ZrO_2$ based upon the weight of the alumina.

15. The process of claim 13 in which the stabilizer is a vanadium compound of the class consisting of the oxide and compounds converted to the oxide by calcination at temperatures below 2600° F. in an amount in the range of 0.1 to 5 weight per cent calculated as $V_2O_3$ based upon the weight of the alumina.

16. The process of claim 13 in which the stabilizer is a molybdenum compound of the class consisting of the oxide and compounds converted to the oxide by calcination at temperatures below 2600° F. in an amount in the range of 0.1 to 5 weight per cent calculated as $MoO_3$ based upon the weight of the alumina.

17. A process for manufacturing heat-exchange pebbles which comprises forming an intimate plastic compactable mixture of powdered spinel, a finely comminuted aluminum compound selected from the group consisting of active alumina and aluminum compounds converted thereto by calcination at temperatures below 2600° F., and a volatile binder and plasticizer; compacting said mixture into small coherent balls; slowly heating the balls so as to drive off volatile matter while avoiding formation of cracks in said balls; calcining the resulting balls at a temperature in the range of 2900° to 3200 F. for a period of at least 2 hours and until the alumina is converted to alpha corundum in interlocking arrangement with the spinel crystals.

18. The process of claim 17 in which the aluminum compound is a partially dehydrated alumina.

SAM P. ROBINSON.

REFERENCES CITED

The following references are of record in the file of this patent:

UNITED STATES PATENTS

| Number | Name | Date |
|---|---|---|
| 1,394,442 | Purdy et al. | Oct. 18, 1921 |
| 2,048,263 | Haglund | July 21, 1936 |
| 2,432,873 | Ferro, Jr., et al. | Dec. 16, 1947 |

OTHER REFERENCES

Norton, Jr., Chemical and Metallurgical Engineering Pebble Heater, pp. 116–19, July 1946.